(12) United States Patent
Bergeron

(10) Patent No.: US 11,701,993 B2
(45) Date of Patent: Jul. 18, 2023

(54) HAULING APPARATUS FOR TRANSPORTING A VEHICLE

(71) Applicant: Marc Bergeron, St-Christophe d'Arthabaska (CA)

(72) Inventor: Marc Bergeron, St-Christophe d'Arthabaska (CA)

(73) Assignee: MARC BERGERON, St-Christophe d'Arthbaska (CA)

( * ) Notice: Subject to any disclaimer, the term of this patent is extended or adjusted under 35 U.S.C. 154(b) by 48 days.

(21) Appl. No.: 17/247,068

(22) Filed: Nov. 26, 2020

(65) Prior Publication Data
US 2021/0155141 A1 May 27, 2021

Related U.S. Application Data

(60) Provisional application No. 62/940,501, filed on Nov. 26, 2019.

(51) Int. Cl.
*B60P 3/077* (2006.01)
*B60D 1/52* (2006.01)

(52) U.S. Cl.
CPC ............... *B60P 3/077* (2013.01); *B60D 1/52* (2013.01)

(58) Field of Classification Search
CPC .. B60P 3/077; B60D 1/52; B60D 1/54; B60D 2001/546; B60D 2001/542
See application file for complete search history.

(56) References Cited

U.S. PATENT DOCUMENTS

| | | | | |
|---|---|---|---|---|
| 3,311,245 | A * | 3/1967 | Galey | B60P 3/127 280/402 |
| 4,592,564 | A * | 6/1986 | Warnock | B60R 9/06 280/402 |
| 4,921,390 | A * | 5/1990 | Baines | B60P 3/127 280/402 |
| 5,108,237 | A * | 4/1992 | Zankich | B60P 3/075 410/21 |
| 5,145,308 | A * | 9/1992 | Vaughn | B60R 9/10 414/537 |
| 5,620,197 | A * | 4/1997 | Howes | B60R 9/06 280/402 |
| 5,697,629 | A * | 12/1997 | Guild | B60R 9/10 280/402 |
| 6,682,292 | B2 * | 1/2004 | Estes | B60R 9/10 414/427 |
| 7,513,725 | B1 * | 4/2009 | Bullock | B60P 3/075 410/11 |
| 7,694,861 | B1 * | 4/2010 | Neely | B60P 3/125 280/402 |
| 7,704,034 | B1 * | 4/2010 | Quigley, III | B60P 3/125 414/427 |

(Continued)

*Primary Examiner* — Kevin Hurley
*Assistant Examiner* — Michael R Stabley
(74) *Attorney, Agent, or Firm* — Brouillette Legal Inc.; Robert Brouillette

(57) ABSTRACT

A hauling apparatus is disclosed, the hauling apparatus comprising a frame adapted to be secured to a hauling vehicle and a pivotable wheel-receiver pivotably secured to the frame about a vertical pivot axis thereof, wherein the pivotable platform is adapted to receive thereon a non-steerable wheel of a hauled vehicle and provide angular movement between the hauling vehicle and the hauled vehicle.

19 Claims, 11 Drawing Sheets

(56) References Cited

U.S. PATENT DOCUMENTS

| | | | | |
|---|---|---|---|---|
| 8,016,313 B2* | 9/2011 | Gilels | ................... | B60P 3/125 |
| | | | | 280/402 |
| 8,075,012 B1* | 12/2011 | Perez | ................... | B60P 3/125 |
| | | | | 414/463 |
| 8,302,235 B1* | 11/2012 | Bailie | ................... | B60P 1/43 |
| | | | | 414/537 |
| 9,539,951 B1* | 1/2017 | Levi | ................... | B60P 3/125 |
| 10,065,550 B2* | 9/2018 | Masanz | ................ | B60D 1/155 |
| 10,384,502 B2* | 8/2019 | Connelly | ................ | B60D 1/46 |
| 11,130,436 B2* | 9/2021 | Ayoub | ................... | B60R 9/06 |
| 2015/0191113 A1* | 7/2015 | Frahm | ................... | B60P 3/125 |
| | | | | 414/484 |
| 2017/0120795 A1* | 5/2017 | Masanz | ................ | B60D 1/665 |
| 2019/0351837 A1* | 11/2019 | Murray | ................ | B60D 1/46 |

\* cited by examiner

HAULING APPARATUS FOR TRANSPORTING A VEHICLE

CROSS-REFERENCE TO RELATED APPLICATIONS

The present patent application claims the benefits of priority of U.S. Provisional Patent Application No. 62/940,501, entitled "HAULING APPARATUS FOR TRANSPORTING A VEHICLE", as filed at the United States Patent and Trademark Office on Nov. 26, 2019, the content of which is incorporated herein by reference.

FIELD OF THE INVENTION

The present invention generally relates to the field of trailer for hauling a vehicle. More specifically, the present invention relates to a hauling apparatus for supporting a non-steerable wheel of a vehicle.

BACKGROUND OF THE INVENTION

Owners of many vehicles may have a desire to carry more than one vehicle at a time. A hauling vehicle can pull a hauled vehicle with a trailer adapted to support the hauled vehicle. The hauled vehicle can also be semi-supported by a trailer supporting the wheels of the hauled vehicle that are operatively connected to the transmission of the hauled vehicle to prevent any damages to the drive systems of the hauled vehicle when it is towed. Alternatively, the hauled vehicle can move on its own free wheels while being attached to the hauling vehicle with a hauling apparatus supporting the driven wheels.

A type of three-wheeled vehicle including a single rear drive wheel might be hauled behind another generally larger hauling vehicle. The pair of front steering wheels are not operatively connected to the transmission and the engine of the vehicle and are free to rotate. Ideally, the pair of front wheels remains on the ground when the three-wheeled vehicle is hauled and the transmission-connected rear wheel has to be lifted from the ground and supported to prevent any contact with the ground to prevent undesirable damages to the drive portion of the three-wheeled vehicle.

Consequently, a need has been felt for a mechanism adapted to haul a three-wheeled vehicle over the existing art. It is therefore desirable to provide hauling mechanism adapted to support a rear driving wheel of a rear-drive vehicle having a three-wheeled configuration.

OBJECTS OF THE INVENTION

An object of the present invention, in accordance with at least one embodiment thereof, is providing a hauling mechanism for transporting a three-wheeled vehicle.

One other object of the present invention, in accordance with at least one embodiment thereof, provides a hauling apparatus adapted to lift a rear drive wheel of a three-wheeled vehicle from the ground for transportation.

One object of the present invention, in accordance with at least one embodiment thereof, provides a hauling apparatus for a three-wheeled vehicle that can be retrofitted on an existing hauling vehicle.

One object of the present invention, in accordance with at least one embodiment thereof, provides a hauling apparatus for a three-wheeled vehicle that can be embedded in an OEM vehicle design.

One object of the present invention, in accordance with at least one embodiment thereof, provides a hauling apparatus that is adapted to support a non-steerable wheel of a three-wheeled vehicle.

One object of the present invention, in accordance with at least one embodiment thereof, provides a hauling apparatus that is adapted to provide relative longitudinal angle variations between a hauling vehicle and a hauled vehicle.

One object of the present invention, in accordance with at least one embodiment thereof, provides a hauling apparatus that is adapted to provide a single degree of freedom to allow a relative movement between a hauling vehicle and a hauled vehicle.

One object of the present invention, in accordance with at least one embodiment thereof, provides a hauling apparatus that is adapted to support a drive wheel of a three-wheeled vehicle.

One other object of the present invention, in accordance with at least one embodiment thereof, provides a hauling apparatus that is adapted to be secured to a standard hauling vehicle hitch receiver.

One other object of the present invention, in accordance with at least one embodiment thereof, provides a hauling apparatus that can be manually operated.

Other and further objects and advantages of the present invention will be obvious upon an understanding of the illustrative embodiments about to be described or will be indicated in the appended claims, and various advantages not referred to herein will occur to one skilled in the art upon employment of the invention in practice.

SUMMARY OF THE INVENTION

The present invention includes many aspects and features. The aforesaid and other objectives of the present invention are realized by generally providing a new hauling apparatus and method of use thereof.

One aspect of the invention provides, in accordance with at least one embodiment thereof, a hauling apparatus that can be added and secured to a hitch of a hauling vehicle.

One aspect of the invention provides, in accordance with at least one embodiment thereof, a hauling apparatus that can be added and removably secured to a rear portion of a hauling vehicle.

One aspect of the invention provides, in accordance with at least one embodiment thereof, a hauling apparatus that can pivot to support a non-steerable wheel of a hauled vehicle.

One other aspect of the invention provides, in accordance with at least one embodiment thereof, a hauling apparatus that is including a pivot mechanism to allow a changing angle between the hauling vehicle and the hauled vehicle longitudinal axial direction.

One other aspect of the invention provides, in accordance with at least one embodiment thereof, a hauling apparatus that can be positioned in a hauling configuration and a stored configuration.

One other aspect of the invention provides, in accordance with at least one embodiment thereof, a hauling apparatus that has no wheels thereon and is using the hauling vehicle to lift a portion of the hauled vehicle.

One aspect of the invention provides, in accordance with at least one embodiment thereof, a hauling apparatus that is configured to support and secure thereon a non-steerable rear dive wheel operatively connected to a swing arm of a three-wheeled vehicle.

One aspect of the invention provides, in accordance with at least one embodiment thereof, a hauling apparatus adapted to provide a single degree of freedom in a plan substantially parallel with the ground in combination with a second degree of freedom provided between a supported wheel and the swing arm of the hauled vehicle.

In another aspect of the invention, a hauling apparatus for a vehicle is provided. The hauling apparatus comprises a frame adapted to be secured to a hauling vehicle and a pivotable wheel-receiver pivotably secured to the frame about a vertical pivot axis thereof, the pivotable platform being adapted to receive thereon a non-steerable wheel of the vehicle and to provide angular movement between the hauling vehicle and the hauled vehicle.

The hauling apparatus may provide a single degree of freedom in a plan substantially parallel with the ground or the pivotable wheel-receiver may further comprises lateral members. The hauling apparatus may further comprise a securing member for securing the non-steerable wheel to the hauling apparatus. The securing member may comprise a belt configured to circumvent the non-steerable wheel. The securing member comprises a safety leash.

The frame may further comprise a vertical receiver. The vertical receiver may comprise a pivoting member. The hauling apparatus may further comprise a ramp for loading the non-steerable wheel onto the hauling apparatus. The hauling apparatus further comprises a receiver configured to receive the ramp in a vertical position. The pivotable wheel-receiver may further comprise a securing mechanism for securing the ramp.

The pivotable wheel-receiver may be removably secured to the frame. The pivotable wheel-receiver may be removably secured in a hauling configuration or a storage configuration.

In a further aspect of the invention, a method of hauling a three-wheeled vehicle is provided. The method comprises securing a frame to a hitch of a hauling vehicle, the frame comprising a pivotable wheel-receiver and securing a non-steerable wheel of the hauled vehicle to the pivotable wheel-receiver.

The method may comprise securing a ramp to a vertical receiver of the frame. The securing of the non-steerable wheel comprises securing a belt to the non-steerable wheel and to the frame. The securing of the non-steerable wheel may further comprise securing a safety chain to the non-steerable wheel. The method may further comprise preventing steerable wheels of the hauled vehicle from moving.

In yet another aspect of the invention, a hauling apparatus for a vehicle is provided. The hauling apparatus comprises a frame secured to a hauling vehicle, the frame comprising a first connector a wheel-receiving portion pivotally attached to the frame about a substantially vertical axis, the wheel-receiving portion being shaped to receive a non-steerable wheel of the vehicle.

The hauling apparatus may further comprise a vertical receiver.

The features of the present invention which are believed to be novel are set forth with particularity in the appended claims. Other and further aspects and advantages of the present invention will be obvious upon an understanding of the illustrative embodiments about to be described or will be indicated in the appended claims, and various advantages not referred to herein will occur to one skilled in the art upon employment of the invention in practice.

BRIEF DESCRIPTION OF THE DRAWINGS

The above and other objects, features and advantages of the invention will become more readily apparent from the following description, reference being made to the accompanying drawings in which.

DETAILED DESCRIPTION

Figure 1:
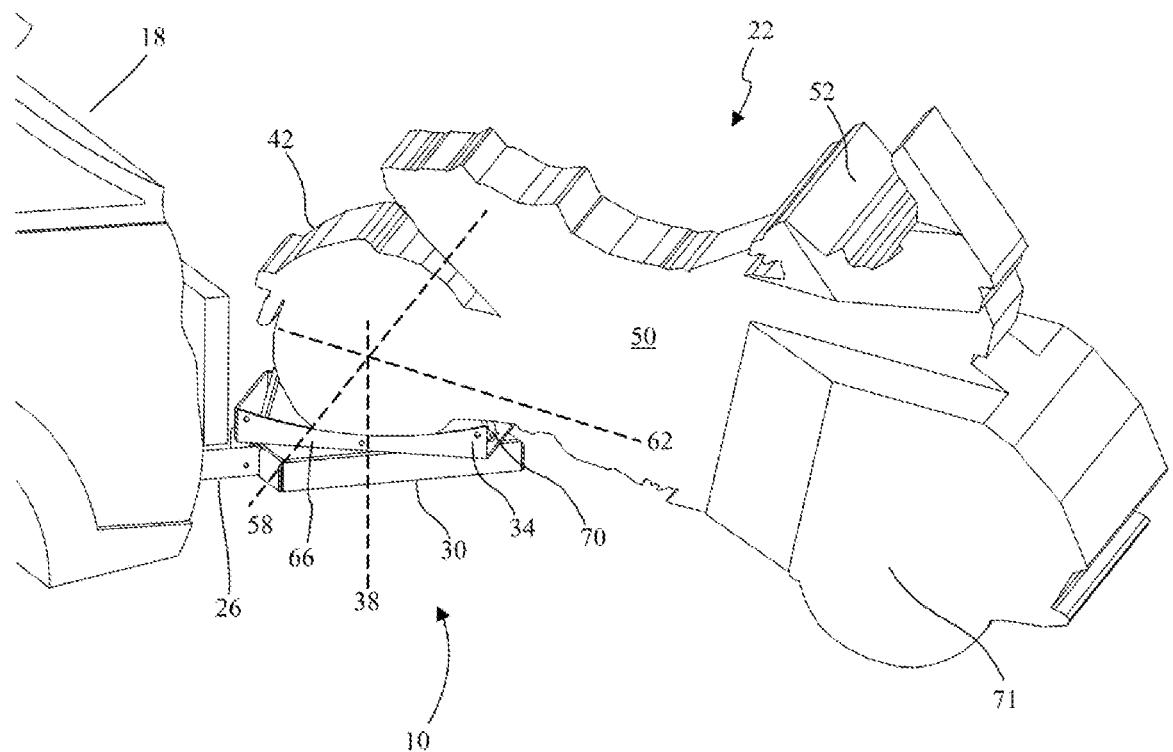
FIG. 1 is a left-top perspective view of the hauling apparatus assembled to a hauling vehicle in accordance with at least one embodiment thereof.

As a preliminary matter, it will readily be understood by one having ordinary skill in the relevant art ("Ordinary Artisan") that the invention has broad utility and application. Furthermore, any embodiment discussed and identified as being "preferred" is considered to be part of a best mode contemplated for carrying out the invention. Other embodiments also may be discussed for additional illustrative purposes in providing a full and enabling disclosure of the invention.

Furthermore, an embodiment of the invention may incorporate only one or a plurality of the aspects of the invention disclosed herein; only one or a plurality of the features disclosed herein; or combination thereof. As such, many embodiments are implicitly disclosed herein and fall within the scope of what is regarded as the invention.

Accordingly, while the invention is described herein in detail in relation to one or more embodiments, it is to be understood that this disclosure is illustrative and exemplary of the invention and is made merely for the purposes of providing a full and enabling disclosure of the invention. The detailed disclosure herein of one or more embodiments is not intended, nor is to be construed, to limit the scope of patent protection afforded the invention in any claim of a patent issuing here from, which scope is to be defined by the claims and the equivalents thereof. It is not intended that the scope of patent protection afforded the invention be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the invention. Accordingly, it is intended that the scope of patent protection afforded the invention is to be defined by the issued claim(s) rather than the description set forth herein.

Additionally, it is important to note that each term used herein refers to that which the Ordinary Artisan would understand such term to mean based on the contextual use of such term herein. To the extent that the meaning of a term used herein—as understood by the Ordinary Artisan based on the contextual use of such term—differs in any way from any particular dictionary definition of such term, it is intended that the meaning of the term as understood by the Ordinary Artisan should prevail.

With regard solely to construction of any claim with respect to the United States, no claim element is to be interpreted under 35 U.S.C. 112(f) unless the explicit phrase "means for" or "step for" is actually used in such claim element, whereupon this statutory provision is intended to and should apply in the interpretation of such claim element. With regard to any method claim including a condition precedent step, such method requires the condition precedent to be met and the step to be performed at least once during performance of the claimed method.

Furthermore, it is important to note that, as used herein, "a" and "an" each generally denotes "at least one," but does not exclude a plurality unless the contextual use dictates otherwise. Thus, reference to "a picnic basket having an apple" describes "a picnic basket having at least one apple" as well as "a picnic basket having apples." In contrast, reference to "a picnic basket having a single apple" describes "a picnic basket having only one apple."

When used herein to join a list of items, "or" denotes "at least one of the items," but does not exclude a plurality of items of the list. Thus, reference to "a picnic basket having cheese or crackers" describes "a picnic basket having cheese without crackers", "a picnic basket having crackers without cheese", and "a picnic basket having both cheese and crackers." When used herein to join a list of items, "and" denotes "all of the items of the list." Thus, reference to "a picnic basket having cheese and crackers" describes "a picnic basket having cheese, wherein the picnic basket further has crackers," as well as describes "a picnic basket having crackers, wherein the picnic basket further has cheese."

Referring the drawings, one or more preferred embodiments of the invention are next described. The following description of one or more preferred embodiments is merely exemplary in nature and is in no way intended to limit the invention, its implementations, or uses. Hence, a novel hauling apparatus for transporting a vehicle will be described herein after.

Figure 2:
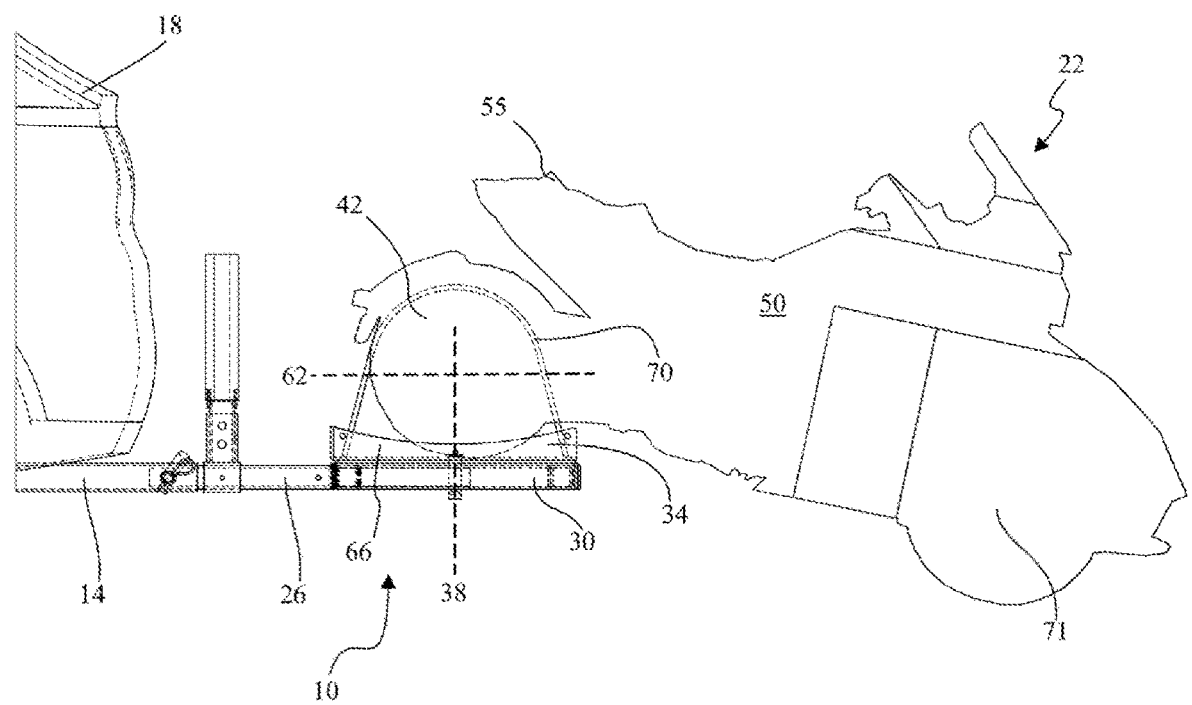
FIG. 2 is a left elevation view of the hauling apparatus assembled to a hauling vehicle in accordance with the principles of the present invention.

An embodiment of the hauling apparatus 10 is illustrated in FIGS. 1 and 2. The hauling apparatus 10 is illustratively connected to a hitch 14 of a hauling vehicle 18 in a hauling configuration 22 thereof. The hauling apparatus 10 comprises a frame 26, a fixed portion 30 secured to the frame 26 and a pivotable wheel-supporting portion 34 disposed on top of the fixed portion 30. The pivotable wheel-supporting portion 34 is pivotably secured to the frame 26 and is pivotable about a pivot axis 38 thereof. The pivotable wheel-supporting portion 34 is configured to receive thereon, support and secured thereon a non-steerable wheel 42 of a hauled vehicle 50, typically located on the rear end of the hauled vehicle.

It can be appreciated from FIG. 1 that the rear wheel 42 of the hauled vehicle 50, in the illustrated embodiment, is laterally supported by a pair of lateral members 66 and is secured on the pivotable wheel-supporting portion 34 with, for example, a belt 70, circumventing the rear wheel 42. The rear wheel 42 is optimally located on the pivotable wheel-supporting portion 34 in vertical alignment with the pivot axis 38. The pivot axis 38 is embodied with an exemplary 24.5 millimeters (1") diameter steel rod acting as a pivot axle 118. Sufficient distance between the hauling vehicle 18 and the rearmost portion of the hauled vehicle 50 is required to prevent interferences whit the swing portion.

In embodiments where the hauled vehicle 50 comprises steerable front wheels 71, it may be desirable to prevent the steerable front wheels 71 to steer when the hauling vehicle 18 moves in a rearward direction. In some embodiments, the steering 52 of the vehicle 50 is prevented from moving. In the embodiment shown in FIG. 1, the steering 52 is attached to a fixed portion of the vehicle 50, such as a foot support, using a strap (not shown). Preferably, another strap shall be installed between the other side of the steering 52 and another fixed portion of the vehicle 50. Understandably, any other means to prevent the steering 52 of the hauled vehicle 50 to move may be used within the scope of the present invention, such as using an elongated member (not shown) mounted to the steering 52 at one end and mounted to a portion of the hauled vehicle 50, such as a passenger handle 55.

Figure 3:
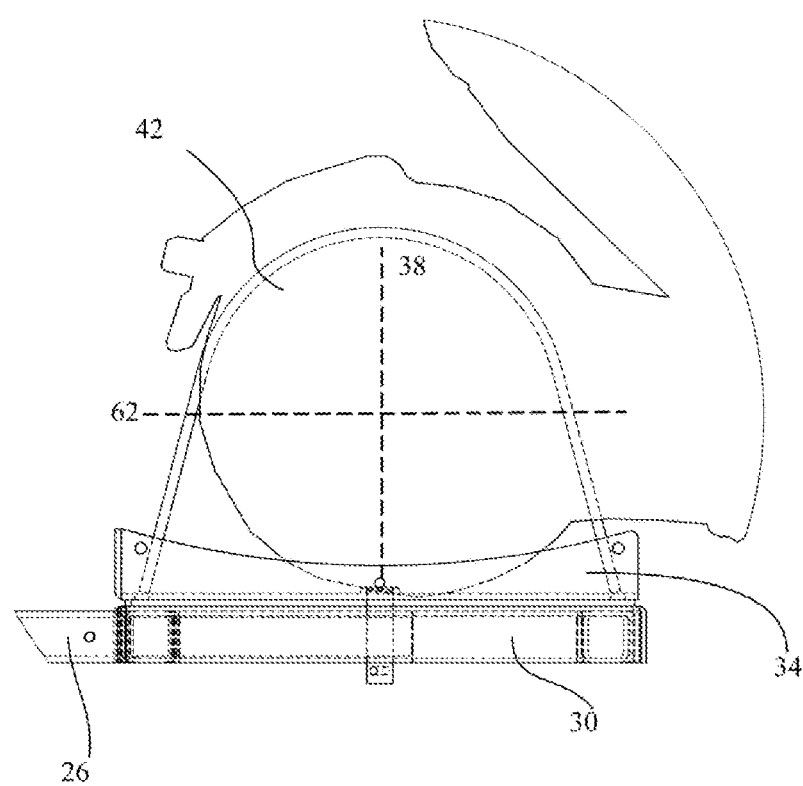
FIG. 3 is a left elevation side view of a portion of the hauling apparatus assembled to a hauling vehicle in accordance with the principles of the present invention.
Figure 4:
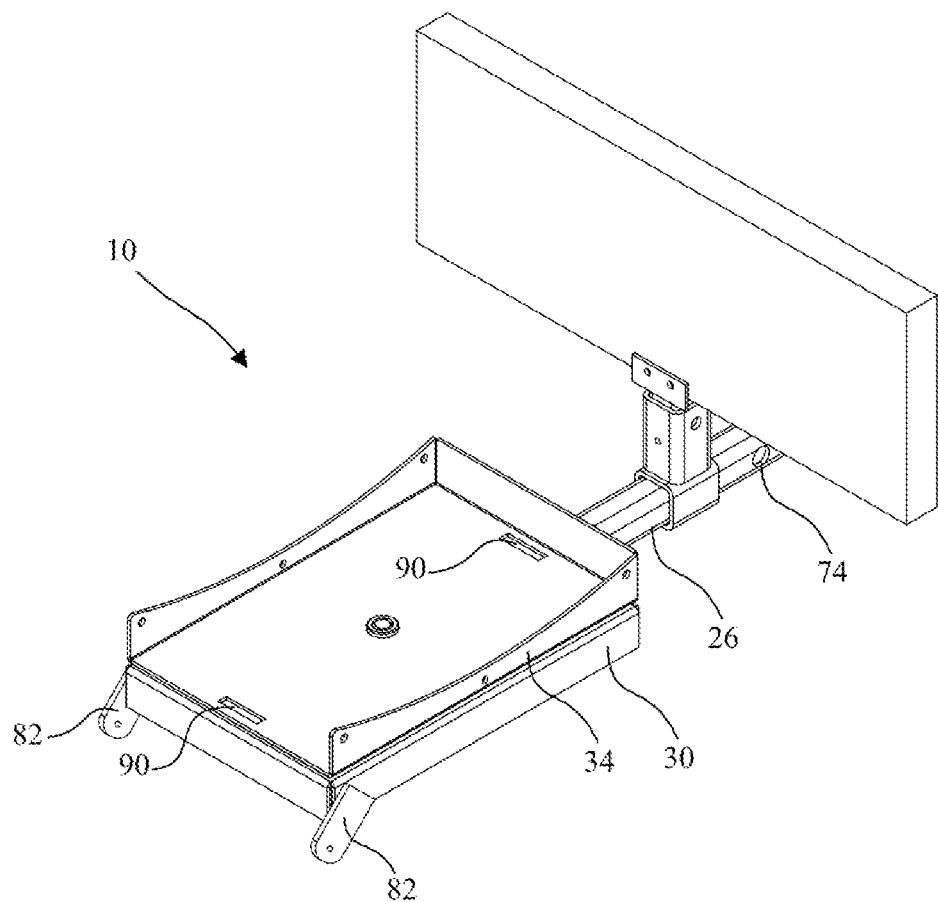
FIG. 4 is a right-top perspective view of the hauling apparatus in accordance with the principles of the present invention.
Figure 5:
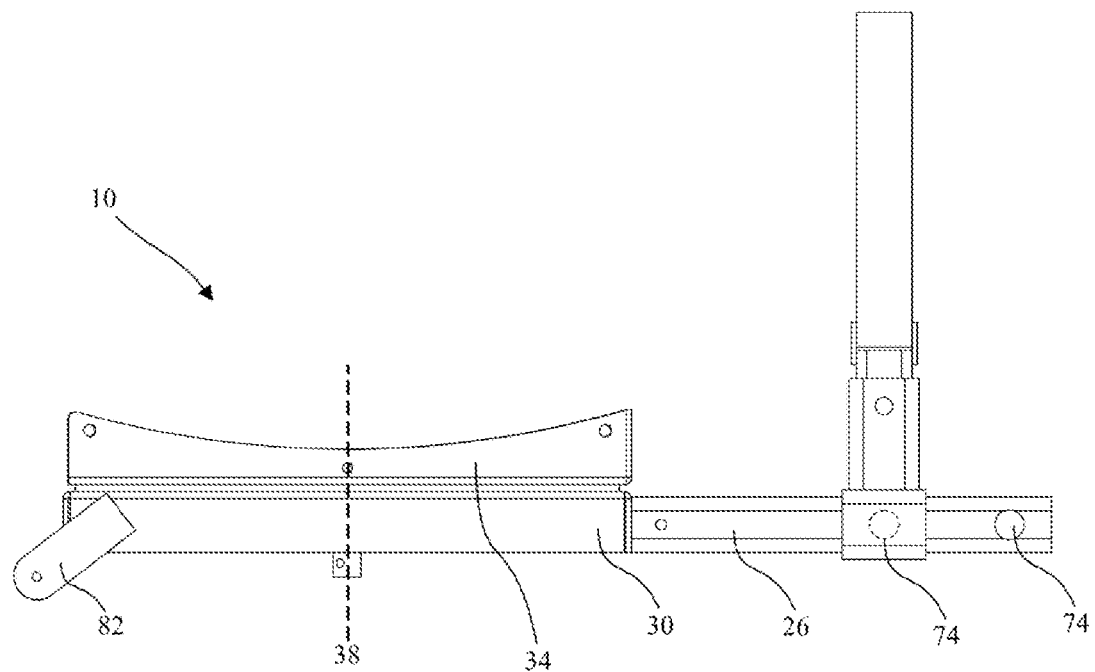
FIG. 5 is a right elevation view of the hauling apparatus of FIG. 4.
Figure 6:
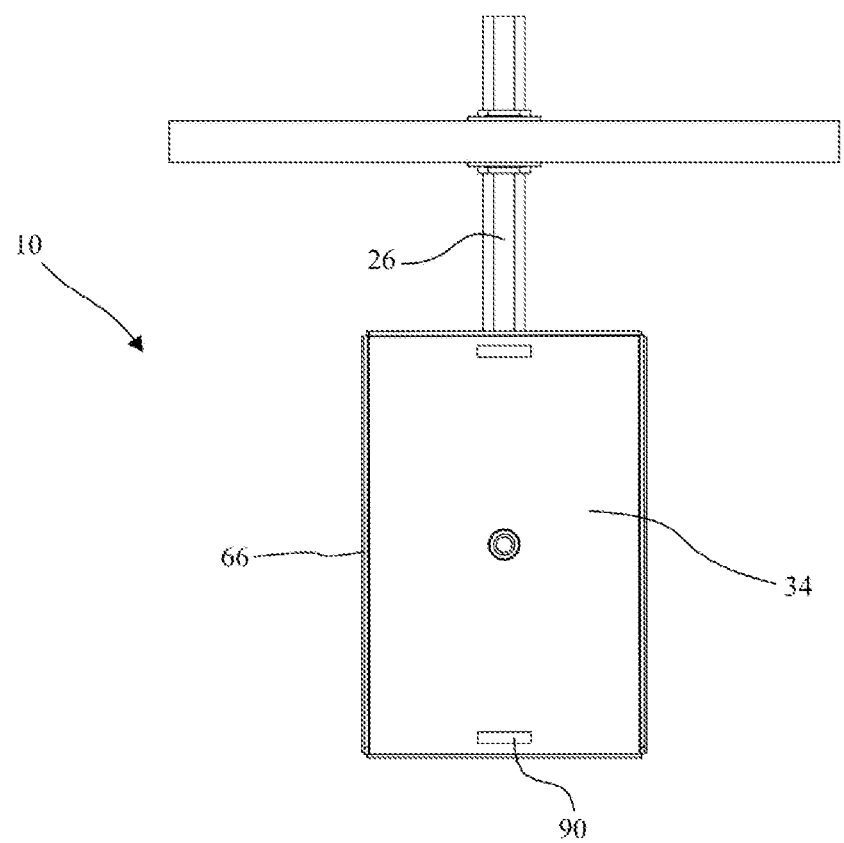
FIG. 6 is a top plan view of a portion of the hauling apparatus of FIG. 4.
Figure 7:
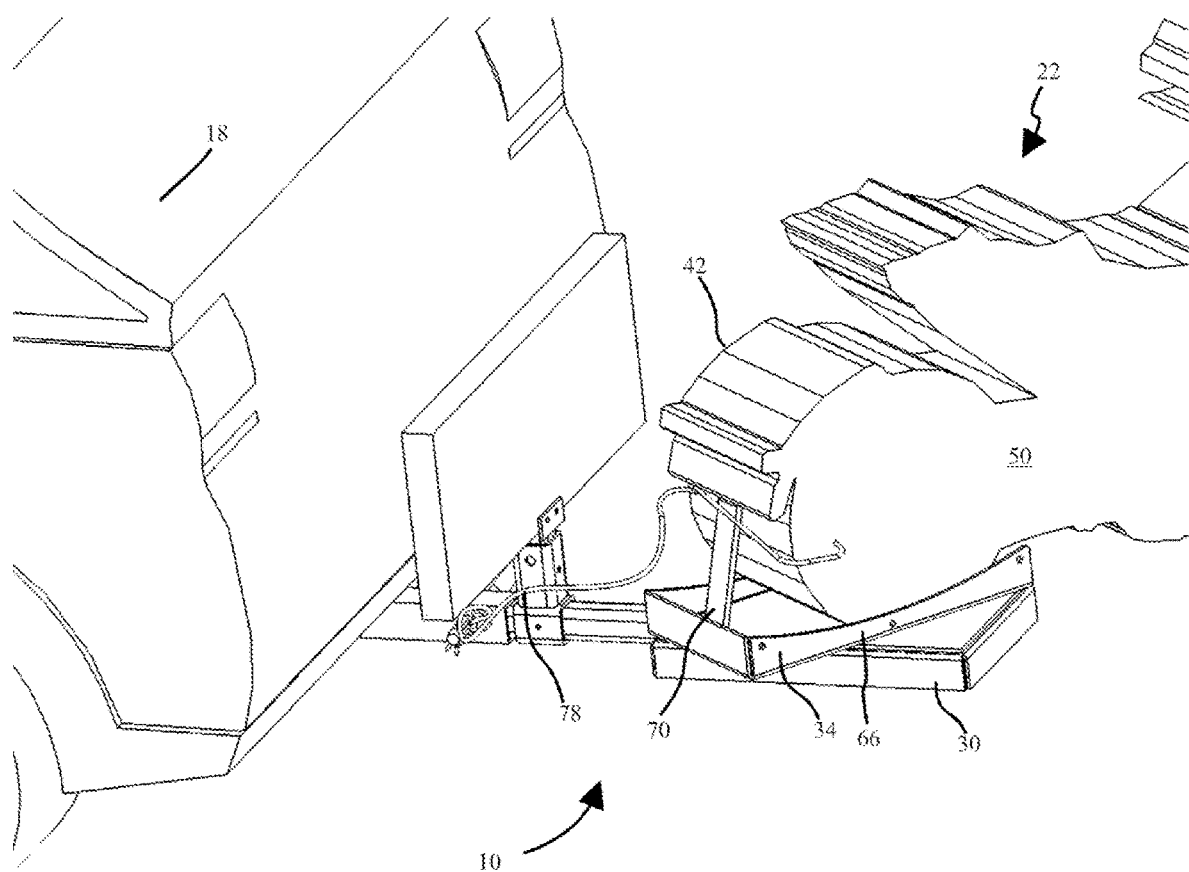
FIG. 7 is a left-top perspective view of the hauling apparatus attached to a hauling vehicle in accordance with the principles of the present invention.

FIG. 3 is a schematic illustration of a preferred embodiment of the invention. It can be seen in FIG. 3 that the non-steerable wheel 42 is axially aligned with the pivot axis 38 and is supported by the pivotable wheel-supporting portion 34. The pivotable wheel-supporting portion 34 is pivotally illustrated on top of the corresponding fixed portion 30.

Turning now to FIGS. 4 to 7 schematically illustrating an embodiment of the hauling apparatus 10 with additional details. Indeed, the frame 26 includes a plurality of holes 74 therein for selectively securing the frame 26 to the hitch receiver 14 of the hauling vehicle 18. A safety cable 78 is also provided and connected to the frame 26 for further securing the non-steerable wheel 42 to the frame 26. The safety cable 78 can be secured to more than a single place on the hauling apparatus 10 to secure different portions of the assembly without departing from the scope of the present description. The safety cable 78 may comprise a safety steel cable or a safety chain. The fixed portion 30 includes a plurality of ramp-securing members 82 preferably disposed at the rear end of the fixed portion 30. A ramp 140 (illustrated in FIGS. 6 to 11) is used to climb the rear wheel 42 on the wheel-supporting portion 34. Accordingly, the ramp 140 may be secured to the ramp-securing members 82 when installed to mount the rear non-steerable wheel 42 onto the wheel-supporting portion 34.

In other embodiments, the ramp 140 may comprise ramp-securing members 82 configured to be secured to the fixed portion 30 to mount the rear non-steerable wheel 42 onto the wheel-supporting portion 34. It may be appreciated that the hauling apparatus 10 may comprise any other suitable means for removably affixing the ramp 140 to the fixed portion 30 including, but not limited to, fasteners, connectors, attachment members and magnetic systems. Understandably, the ramp 140 may be secured to the frame of the hauling apparatus at any angle allowing the non-steerable wheel to move to the wheel-supporting portion 34. The wheel-supporting portion 34 may further include openings 90 therein for receiving therein the belt 70 used to circumscribe the non-steerable wheel 42.

Figure 8:
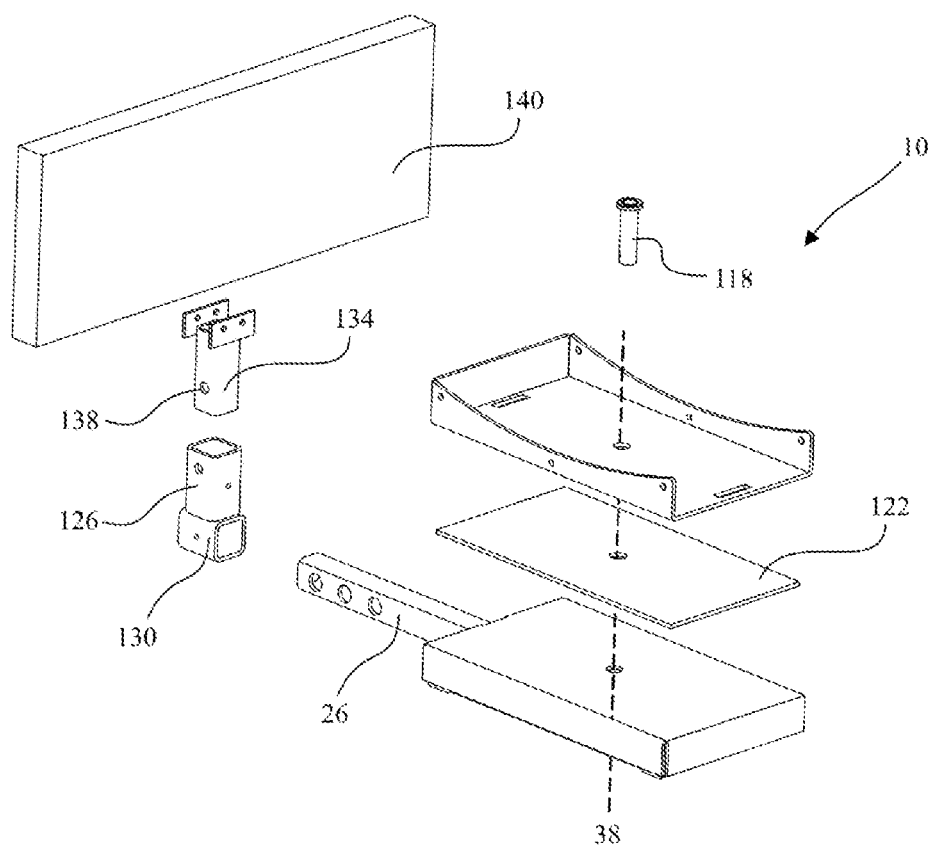
FIG. 8 is a left-top perspective exploded view of a portion of the hauling apparatus of FIG. 4.

An exploded view of another embodiment of the invention is shown in FIG. 8. In certain embodiments, additional features can be added to the hauling apparatus 10 such as a bicycle rack, a partition or any other desirable feature. The frame 26 can be adapted with a vertical receiver 126 and a horizontal receiver 130, both of which may be configured to receive the features. In the illustrated embodiment, the vertical receiver 126 is configured to receive a ramp 140 when it is not in use. In this configuration, the ramp 140 may additionally form a partition or barrier between the hauling vehicle 18 and the hauled vehicle 50 thereby preventing potential contact between the two vehicles. Other frame members are illustrated, exploded, from their assembly locations to reinforce the assembly. In particular, a polytetrafluoroethylene (PTFE) plate 112 is illustrated. The PTFE plate 112 may be configured to reduce friction between the fixed portion 30 and the wheel-supporting portion 34. Other configurations of part might become apparent to a skilled reader and, although they are different, remain conceptually analogous and thus remain within the scope of the present description.

Figure 9:
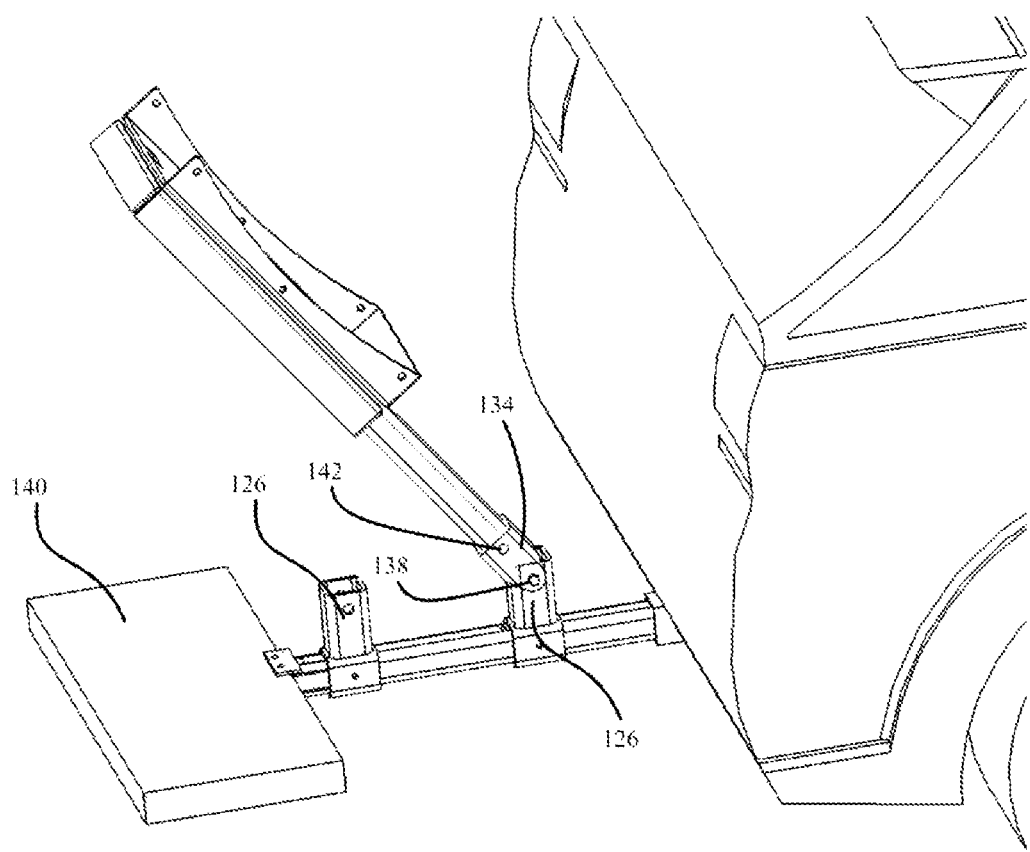
FIG. 9 is a right-top perspective view of the hauling apparatus shown being pivoted in accordance with the principles of the present invention.
Figure 10:
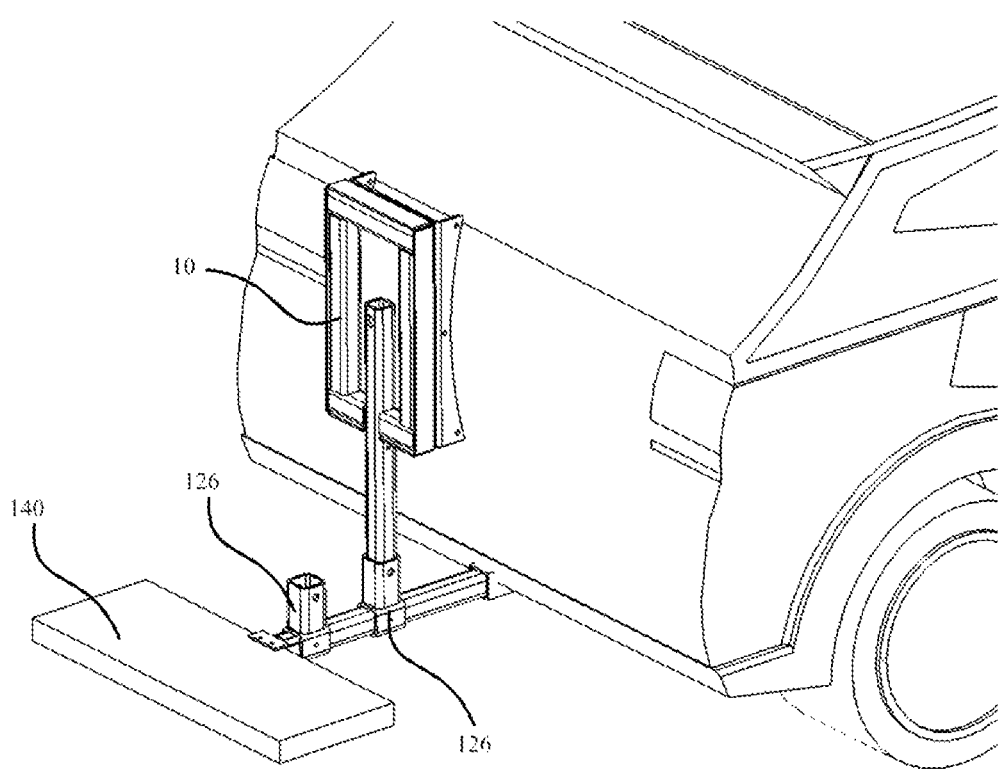
FIG. 10 is a right-top perspective view of the hauling apparatus in a first storage configuration in accordance with at least one embodiment thereof.
Figure 11:
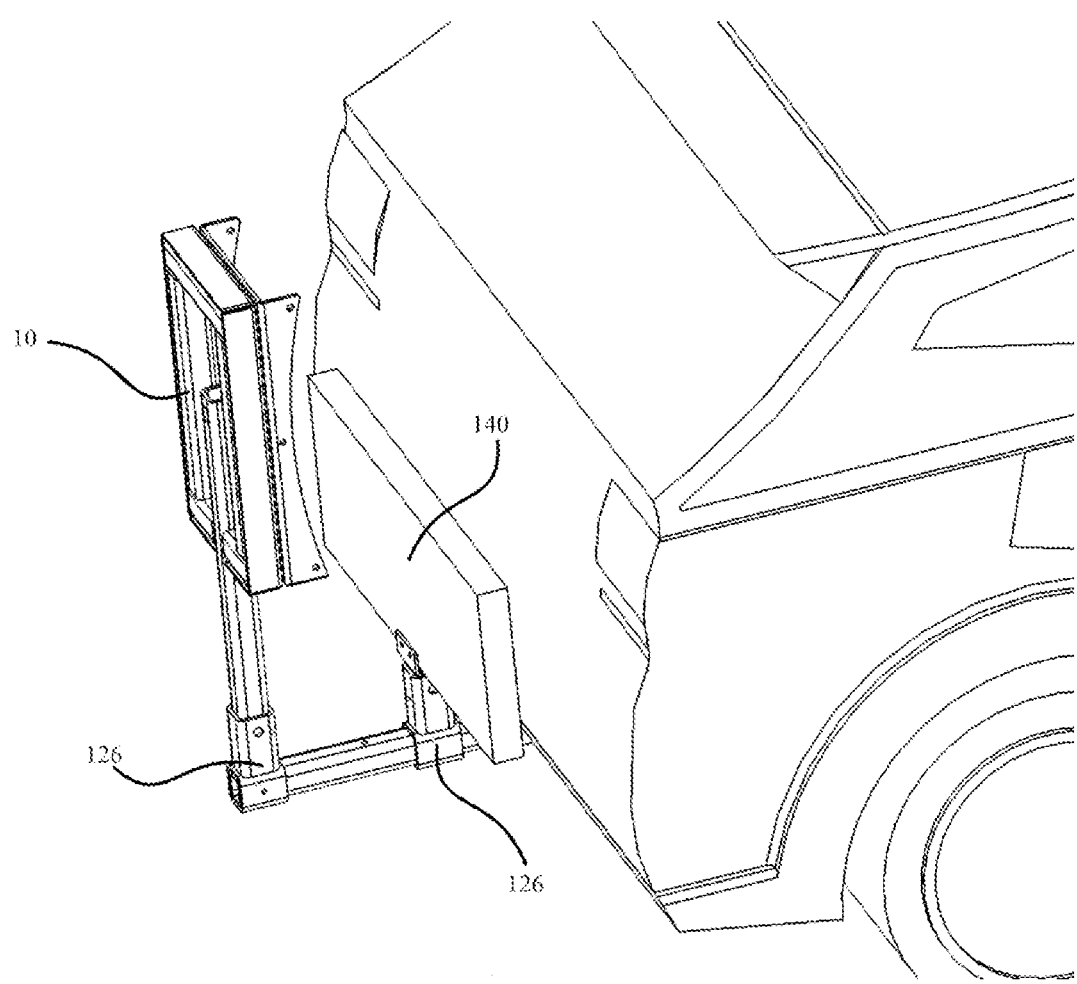
FIG. 11 is a right-top perspective view of the hauling apparatus in a second storage configuration in accordance with at least one embodiment thereof.

Referring now to FIGS. 9 to 11, the hauling apparatus 10 is stored in a substantially vertical position for transportation or for storage, in an embodiment thereof. This storage configuration is suited for transportation of the hauling apparatus 10 when not in use to haul a hauled vehicle 50. In the storage configuration, the fixed portion 30 and the pivotable wheel-supporting portion 34 may be positioned vertically in the vertical receiver 126 thereby occupying less space in the longitudinal direction 62 as opposed to a hauling configuration 150 illustrated in FIG. 1.

In certain embodiments, two vertical receivers 126 are illustrated, one of which may comprise a pivotable member 134 configured to pivot to allow access with to the rear storage compartment of the hauling vehicle 18 when a feature is stored within the vertical receiver 126. The pivotable member 134 is connected to the vertical receiver 126 at a first pivoting end 138 thereof and receives the accessory at a second end 142 thereof. Referring now to FIG. 11, both the hauling apparatus 10 and the ramp 140 may be stored within the vertical receivers 126 with horizontal receiver 130 receiving no accessory.

While illustrative and presently preferred embodiment(s) of the invention have been described in detail hereinabove, it is to be understood that the inventive concepts may be otherwise variously embodied and employed and that the appended claims are intended to be construed to include such variations except insofar as limited by the prior art.

What is claimed is:

1. An apparatus for hauling a vehicle, the apparatus comprising:
   a frame adapted to be secured to a hauling vehicle; and
   a pivotable wheel-receiver platform pivotably secured to the frame about a vertical pivot axis thereof, the vertical axis passing through a central portion of the received rear non-steerable wheel of the hauled vehicle, wherein the pivotable wheel-receiver platform is adapted to receive thereon a rear non-steerable wheel of the hauled vehicle and provide angular movement between the hauling vehicle and the hauled vehicle;
   a steering attachment mechanism for preventing steering of at least one steerable front wheel of the hauled vehicle.

2. The apparatus of claim 1, wherein the apparatus provides a single degree of freedom in a plan substantially parallel with the ground.

3. The apparatus of claim 1, wherein the pivotable wheel-receiver further comprises lateral members.

4. The apparatus of claim 1, wherein the apparatus further comprises a securing member for securing the non-steerable wheel to the hauling apparatus.

5. The apparatus of claim 4, wherein the securing member comprises a belt configured to circumvent the non-steerable wheel.

6. The apparatus of claim 4, wherein the securing member comprises a safety leash.

7. The apparatus of claim 1, wherein the frame further comprises a vertical receiver.

8. The apparatus of claim 7, wherein the vertical receiver comprises a pivoting member.

9. The apparatus of claim 1, wherein the apparatus further comprises a ramp for lifting the non-steerable rear wheel onto the pivotable wheel-receiver, the ramp comprising a securing member mating with a receiving member of the hauling vehicle, the ramp being vertically attachable to frame in a storing position and angularly attached to the frame in a lifting position.

10. The apparatus of claim 9, wherein the pivotable wheel-receiver further comprises a securing mechanism for securing the ramp.

11. The apparatus of claim 1, wherein the pivotable wheel-receiver platform is removably secured to the frame.

12. The apparatus of claim 1, wherein the pivotable wheel-receiver is removably secured in a hauling configuration or a storage configuration.

13. The apparatus of claim 1, the vertical pivot axis of the pivotable wheel-receiver being aligned with a central portion of the received rear non-steerable wheel of the hauled vehicle.

14. The apparatus of claim 1, the steering attachment mechanism comprising a first end attachable to a portion of the steering of the hauled vehicle and a second end attachable to a fixed portion of the hauled vehicle.

15. A method of hauling a three-wheeled vehicle, the method comprising:
   securing a frame to a hitch of a hauling vehicle, the frame comprising a wheel-receiver pivotable about a substantially vertical axis; and
   securing a rear non-steerable wheel of the hauled three-wheeled vehicle to the pivotable wheel-receiver to allow the vertical axis to pass through a central portion of the non-steerable wheel;
   preventing steering of at least one steerable front wheel of the hauled vehicle.

16. The method of claim 15 further comprising securing a ramp to a vertical receiver of the frame.

17. The method of claim 15, wherein the securing of the non-steerable wheel comprises securing a belt to the non-steerable wheel and to the frame.

18. The method of claim 15, wherein the securing of the non-steerable wheel comprises securing a safety chain to the non-steerable wheel.

19. The method of claim 15 further comprising preventing steerable wheels of the hauled three-wheeled vehicle from moving.

\* \* \* \* \*